US006975654B1

(12) United States Patent
Domon

(10) Patent No.: US 6,975,654 B1
(45) Date of Patent: Dec. 13, 2005

(54) NETWORK SYNCHRONIZATION SYSTEM AND NETWORK SYNCHRONIZATION METHOD

(75) Inventor: Wataru Domon, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/551,400

(22) Filed: Apr. 17, 2000

(30) Foreign Application Priority Data

Apr. 22, 1999 (JP) ................................. 11-115062

(51) Int. Cl.[7] .............................................. H04J 3/06
(52) U.S. Cl. ..................................... 370/509; 713/400
(58) Field of Search ................................ 370/503, 507, 370/508, 510, 511, 512, 401, 402, 408, 509; 710/107, 110, 306, 309, 305, 314; 713/400

(56) References Cited

U.S. PATENT DOCUMENTS

| 5,128,971 | A | | 7/1992 | Johnson | |
|---|---|---|---|---|---|
| 6,032,261 | A | | 2/2000 | Hulyalkar | |
| 6,128,318 | A | * | 10/2000 | Sato | 370/503 |
| 6,389,502 | B1 | * | 5/2002 | Toguchi | 710/314 |
| 6,389,547 | B1 | * | 5/2002 | James | 713/400 |
| 6,408,355 | B1 | * | 6/2002 | Toguchi | 710/314 |
| 6,445,711 | B1 | * | 9/2002 | Scheel | 370/402 |
| 6,522,649 | B1 | * | 2/2003 | Staalkamp | 370/389 |
| 6,529,522 | B1 | * | 3/2003 | Ito | 370/466 |
| 6,539,450 | B1 | * | 3/2003 | James | 710/306 |
| 6,556,543 | B1 | * | 4/2003 | Park | 370/255 |
| 6,584,539 | B1 | * | 6/2003 | James | 710/314 |

FOREIGN PATENT DOCUMENTS

| JP | 11-261579 | 9/1999 |
|---|---|---|
| JP | 11-266236 | 9/1999 |
| JP | 2000-32030 | 1/2000 |
| JP | 2000-216800 | 8/2000 |

OTHER PUBLICATIONS

Japanese Office Action dated Feb. 5, 2002, with partial English translation.
Takashi Sato, "Solution for Cycle Master Location Limitation", pp. 1-14, Jan. 26, 1998.

(Continued)

*Primary Examiner*—Chau Nguyen
*Assistant Examiner*—Ricardo Pizarro
(74) *Attorney, Agent, or Firm*—McGinn IP Law Group, PLLC

(57) ABSTRACT

The invention provides, for an IEEE 1394 network wherein a plurality of IEEE 1394 serial buses are connected to each other by means of a bridge, a synchronization method between the buses wherein an existing 1394 apparatus operates even if it is connected to one of the buses and a band resource of the bus is not consumed. As a network cycle master which functions as a reference clock source of an entire network, an arbitrary one portal is selected. In each bus to which the network cycle master is not connected, a portal which has the least node hop number to the network cycle master is selected as a local cycle master. The other portals which are not selected are all set as a dependent portal. The network cycle master and the dependent portals transmit a synchronizing signal to the other portals in the same bridge. Each local cycle master receives the synchronizing signal transmitted from the network cycle master or the dependent portal in the same bridge and performs control of synchronizing the cycle frequency thereof with the cycle frequency of the portal which has transmitted the synchronizing signal. Each of the network cycle master and the local cycle masters operate as a cycle master in the bus to which it is connected.

13 Claims, 13 Drawing Sheets

OTHER PUBLICATIONS

Takashi Sato, "Synchronizing Cycle Master to External Timing Information via Cycle Slave", pp. 1-12, Mar. 19, 1998.

European Search Report dated Apr. 16, 2003.

Masatoshi Ueno, et al. "Cycle Reconfiguration for a Bridge". FIREWIRE/IEEE-1394, 'Online!, Jan. 26, 1998, pp. 2-4.

Takashi Sato, "Synchronizing Cycle Master to External Timing Information Via Cycle Slave", *Synchronizing Cycle Master to External Timing Information Via Cycle Slave*, Mar. 19, 1998, pp. 1-12.

Masa Akahane, et al., "Study on Net Manager Selection Algorithm", FIREWIRE/IEEE-1394, 'Online!, Jun. 9, 1998, pp. 3-22.

Institute of Electrical and Electronics Engineers, "IEEE Standard for a High Performance Serial Bus", *IEEE Standard for a High Performance Serial Bus*, IEEE STD 1394-1995, pp. i, 48, 88, 234-241.

* cited by examiner

FIG.2

| SECOND_COUNT | CYCLE_COUNT | CYCLE_OFFSET |
|---|---|---|
| —7— | —13— | —12— |

FIG.6

| 00 | PHY_ID | R | T | GAP_CNT | 0000 | 0000 | 0000 | 0000 |
|----|--------|---|---|---------|------|------|------|------|
| LOGICAL INVERCE OF FIRST QUADLET ||||||||

FIG.9

| INPUT FROM SUBTRACTION CIRCUIT 100 | OUTPUT OF COMPARISON CIRCUIT 110 |
|---|---|
| GREATER THAN 0 | $01_2$ (fast) |
| 0 | $00_2$ (stay) |
| SMALLER THAN 0 | $10_2$ (slow) |

FIG.11

| INPUTTED CYCLE_OFFSET | OUTPUT OF COMPARISON CIRCUIT 110 |
|---|---|
| GREATER THAN 0 BUT SMALLER THAN 1,536 | $01_2$ (fast) |
| 0 | $00_2$ (stay) |
| EQUAL TO OR GREATER THAN 1,536 | $10_2$ (slow) |

NETWORK SYNCHRONIZATION SYSTEM AND NETWORK SYNCHRONIZATION METHOD

BACKGROUND OF THE INVENTION

1. Field of the Invention

This invention relates to a network synchronization system and a network synchronization method for establishing synchronism of a communication network which employs a bus of the IEEE 1394 standard.

2. Description of the Related Art

The IEEE 1394 standard (hereinafter referred to as 1394) which is a high performance serial bus standard prescribes an isochronous transfer mode which secures a transfer band of a packet. The isochronous transfer mode is realized by introducing a concept of a cycle having a nominal cycle frequency of 8 kHz and a procedure of acquiring in advance a time within which a packet can be transferred for each cycle.

A detailed method prescribed in the IEEE 1394 standard in order to managing cycles is described with reference to FIG. 1. Referring to FIG. 1, the start of a cycle is recognized by detecting a cycle start packet broadcast in the bus. The cycle start packet is transmitted from one node called cycle master set for the bus. The cycle master includes a CYCLE_TIME register for storing the time and keeps the period for transmission of a cycle start packet fixed using the CYCLE_TIME register.

The format of the CYCLE_TIME register prescribed in the IEEE 1394 standard is illustrated in FIG. 2. Referring to FIG. 2, the CYCLE_TIME register is a 32-bit register, wherein the higher order 7 bits are called second_count field, the following 13 bits are called cycle_count field and the lower order 12 bits are called cycle_offset field. The cycle_offset field forms a counter which increments with a clock of a nominal frequency of 24.576 megahertz, and returns its count value to 0 after it comes to 3,071 (decimal number). In other words, the cycle_offset field is a counter whose count value returns to 0 after each 125 microseconds as a period of a cycle. The following cycle_count field forms a counter which increments by one at a timing at which the cycle_offset returns to 0 and counts the number of cycles. The cycle_count field returns to 0 after the count value thereof comes to 7,999 in decimal number. In other words, the cycle_count is a counter whose count value returns to 0 after each one second. The second_count field in the highest order is a counter which increments by one at a timing at which the cycle_count returns to 0, and counts seconds. The second_count field returns to 0 after the count value thereof comes to 127 in decimal number.

The cycle master tries to transmit a cycle start packet at a timing at which the cycle_count field of the CYCLE_TIME register thereof is incremented. If there is no packet being currently transferred on the bus, then the cycle master immediately transmits a cycle start packet, but if there is a packet being currently transferred on the bus, then the cycle master transmits a cycle start packet after the transfer of the packet is completed. Such control is performed in order to keep the period of a cycle substantially fixed. In the cycle start packet, the value of the CYCLE_TIME register when the cycle start packet is transmitted onto the bus is placed. Any other node than the cycle master receives the cycle start packet and overwrites the value of the CYCLE_TIME register of the node with the value placed in the cycle start packet. Consequently, the values of the CYCLE_TIME registers of all nodes connected to the bus are synchronized with the value of the CYCLE_TIME register of the cycle master.

After the cycle start packet is transferred, those nodes which have acquired a band in advance start transmission of an isochronous packet. For transfer of packets, arbitration of the bus is performed after an interval called isochronous gap within which no data transfer is performed is detected, and transmission of the packets is performed in order beginning with a node which has acquired a packet transmission right. After the transfer of all of the isochronous packets for which a band has been acquired is completed, a transfer period for a packet of the best effort type called asynchronous packet is placed for a time after a gap of a long time called sub action gap is detected until a cycle start packet indicative of the start of a next cycle is detected.

It is to be noted that, in an initialization procedure for the bus, a node to which a physical ID of the highest value is allocated is selected as a cycle master.

Meanwhile, an IEEE 1394 bridge (hereinafter referred to as bridge) is investigated wherein a plurality of 1394 buses are connected to each other to perform packet transfer between the different buses. By use of the bridge, increase in scale and in efficiency of a network which employs the IEEE 1394 standard can be achieved. A standardization work is being proceeded by the IEEE P1394.1 Committee.

A basic construction of the bridge is shown in FIG. 3. Referring to FIG. 3, the bridge is basically composed of portals and a switching fabric. A portal is a part at which the bridge is connected to an IEEE 1394 bus, and also the portal itself functions as anode. Meanwhile, a switching fabric is a packet switch for performing packet transfer between portals in the bridge. In FIG. 3, a bridge 10 in which two portals (a portal 20 and another portal 21) and a switching fabric 30 for connecting them to each other are built is shown. However, the number of portals built in one bridge may otherwise be three or more. The portal 20 and the portal 21 are connected to a 1394 bus 40 and another 1394 bus 41, respectively, so that packet transfer can be performed between the buses.

Where isochronous packet transfer between different buses is to be performed using the bridge, it is necessary to synchronize the buses with each other in order to make periods of cycles of all of the buses on a packet transfer route coincide with each other. The IEEE P1394.1 Committee investigates, as a method of establishing synchronism between buses, a method which uses a go_slow command and a go_fast command. Although details of the method are not decided as yet, the concept of the method is such as follows.

Similarly to the existing 1394 standard, even where a network is formed from a plurality of buses using the bridge, a cycle master is determined for each bus and manages synchronization between nodes in the one bus. While, according to the existing IEEE 1394 standard, the CYCLE_TIME register of the cycle master operates in free run, according to the IEEE P1394.1 Committee, synchronism is established between cycle masters to establish synchronism of all nodes on the network. The go_slow command and the go_fast command are used for such establishment of synchronism between cycle masters.

Anode which provides a reference to the time of the entire network, that is, a network cycle master, is selected first. The reference time information of the network cycle master is distributed to all buses on the network by some method. The portal of each bus compares the time information of the network cycle master with time information of the cycle master of the bus, that is, the local cycle master, to which the portal itself is connected. If the comparison reveals that the time of the local cycle master should be delayed, then the portal transmits the go-slow command to the local cycle master, but if it is discriminated that the time of the local cycle master should be advanced, then the portal transmits the go-fast command to the local cycle master. The local cycle master receiving the command transmitted from the portal controls the value of the CYCLE_TIME register thereof in accordance with the command. More particularly, if the go-fast command is received, then the local cycle master increments the value of the cycle_offset field of the CYCLE_TIME register by one, but if the go-slow command is received, then the local cycle master decrements the value of the cycle_offset field by one. By the method described, the periods of cycles of the different buses can be kept equal.

It is to be noted that, since any of the commands must be transferred without any delay for each cycle (after each 125 microseconds), command transfer is performed using the isochronous mode.

In the conventional network synchronization method described above, if an existing 1394 apparatus which does not incorporate the method is connected to the bus and selected as the cycle master, then synchronism cannot be established between the buses. Accordingly, the conventional network synchronization method is disadvantageous in that an existing 1394 apparatus cannot be connected to an IEEE 1394 network constructed using the bridge. The conventional network synchronization method is disadvantageous also in that a resource of isochronous transfer is consumed for establishment of synchronism.

SUMMARY OF THE INVENTION

It is an object of the present invention provides a network synchronization system and a network synchronization method by which synchronism can be established in a network without signaling a control signal for establishment of synchronism onto a bus even if an existing IEEE 1394 apparatus is connected to the network.

In order to attain the object described above, according to an aspect of the present invention, there is provided a network synchronization system for a network wherein a plurality of buses are connected in a tree-like configuration by means of a bridge which has a plurality of portals each of which has a function of a node of the IEEE 1394 standard and to each of which a single bus which complies with the IEEE 1394 standard is connected, comprising a network clock reference node functioning as a reference clock source for the entire network and as a cycle master prescribed in the IEEE 1394 standard, one of the portals included in the network being set as the network clock reference node, and a local clock reference node provided for each of the other buses than the bus to which the network clock reference node is connected and serving as a cycle master prescribed in the IEEE 1394 standard for the bus to which the local clock reference node is not connected, one of the portals connected to each of the other buses which has the least number of hops of nodes up to the network clock reference node being set as the local clock reference node, the local clock reference node including means for synchronizing a cycle frequency thereof with a cycle frequency of the network clock reference node.

According to another aspect of the present invention, there is provided a network synchronization method for a network wherein a plurality of buses are connected in a tree-like configuration by means of a bridge which has a plurality of portals each of which has a function of a node of the IEEE 1394 standard and to each of which a single bus which complies with the IEEE 1394 standard is connected, comprising a first step of determining a network clock reference node which functions as a reference clock source for the entire network and as a cycle master prescribed in the IEEE 1394 standard, a second step of determining a local clock reference node which functions as a cycle master which synchronizes a cycle frequency thereof with a cycle frequency of the network clock reference node, a third step performed by each of the network clock reference node and the local clock reference node or nodes of setting all of the other portals than the network clock reference node or the local clock reference node connected to the bus to which the network clock reference node or the local clock reference node is connected as non-reference nodes, and a fourth procedure performed by each of the network clock reference node and the non-reference nodes of setting all of the other portals of the bridge to which the network clock reference node or the non-reference node is connected as the local clock reference node.

The first step may be performed manually by a manager of the network.

The network synchronization method may be constructed such that each of the network clock reference node and the non-reference nodes transmits a synchronizing signal to all of the other local clock reference nodes of the bridge to which the network clock reference node or the non-reference node is connected, and each of the local clock reference nodes uses the received synchronizing signal to synchronize the cycle frequency of the local clock reference node itself with the cycle frequency of the network clock reference node.

The synchronizing signal may be a signal of a 32-bit width of a CYCLE_TIME register of the node from which the synchronizing signal is transmitted or of a 25-bit width of the lowest order 25 bits or a 12-bit width of the lowest order 12 bits of the CYCLE_TIME register.

The network synchronization method may be constructed such that the synchronizing signal is a signal of a 32-bit width of a CYCLE_TIME register of the node from which the synchronizing signal is transmitted or of a 25-bit width of the lowest order 25 bits or a 12-bit width of the lowest order 12 bits of the CYCLE_TIME register, and the local clock reference node periodically performs control of increasing or decreasing a cycle_offset field of the CYCLE_TIME register of the local clock reference node with a fixed number so that a difference between a portion of the CYCLE_TIME register of the local clock reference node having an equal bit width to that of the synchronizing signal and the value of the synchronizing signal may be fixed.

In this instance, a period in which the control is performed may be equal to a time for 3,072 clocks of a clock source of 24.576 megahertz included in the local clock reference node.

The synchronizing signal may be a pulse signal which is generated at a timing at which the value of a cycle_offset field of a CYCLE_TIME register of the node from which the synchronizing signal is transmitted becomes equal to a predetermined value.

In this instance, the predetermined value may be one of integers equal to or greater than 1,000 but equal to or smaller than 3,070.

The network synchronization may be constructed such that the local clock reference node includes a counter which counts up with a clock source of 24.576 megahertz and returns its count value to 0 when the count value becomes equal to 3,071 but is set to a predetermined value when the pulse signal is received, and periodically performs control of increasing or decreasing the cycle_offset field of the CYCLE_TIME register of the local clock reference node with the fixed number so that the difference between the count value of the counter and the value of the cycle_offset field of the CYCLE_TIME register may be equal.

The local reference node may perform, each time the pulse signal is received, control of increasing or decreasing the cycle_offset register of the CYCLE_TIME register thereof with a fixed number so that the value of the cycle_offset field when the pulse signal is received may be equal to a predetermined value.

With the network synchronization system and the network synchronization method, a network wherein all buses are synchronized with each other can be constructed also in an environment wherein an existing IEEE 1,394 apparatus is connected. Further, since there is no necessity of transferring a control signal for synchronization onto any bus, the bandwidth of the network can be utilized efficiently.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 2 is a diagrammatic view showing a format of a CYCLE_TIME register prescribed in the IEEE 1394 standard;

FIG. 6 is a diagrammatic view showing a format of a PHY configuration packet;

FIG. 9 is a diagrammatic view illustrating specifications of comparison processing performed by a comparison circuit shown in FIG. 8;

FIG. 11 is a diagrammatic view illustrating comparison operation specifications of a comparison operation circuit shown in FIG. 10;

DESCRIPTION OF THE PREFERRED EMBODIMENT

Figure 1:
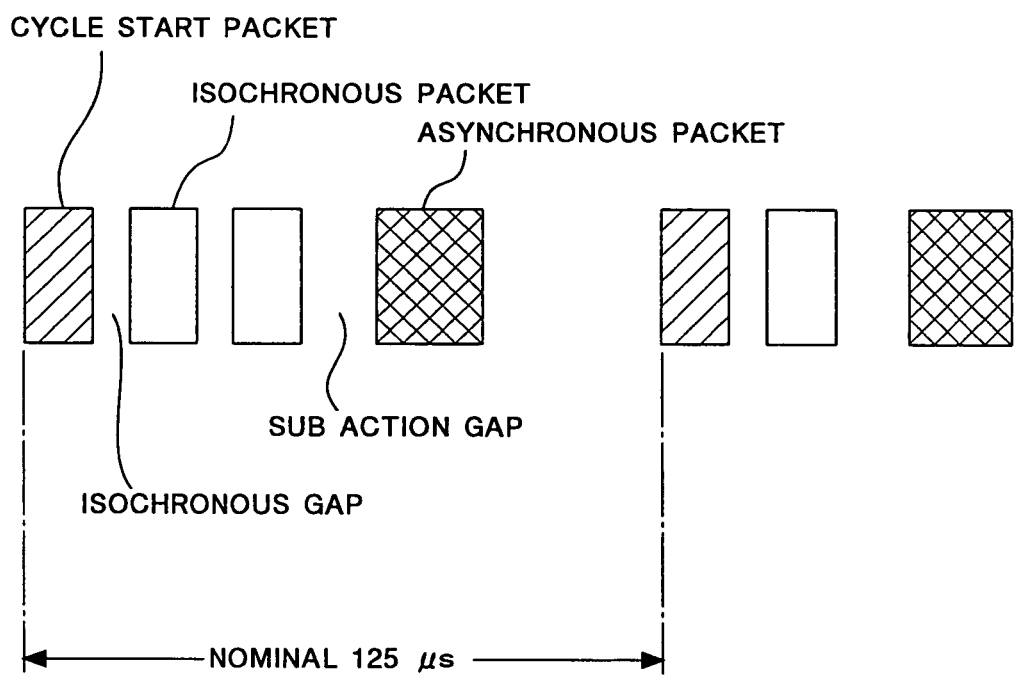
FIG. 1 is a diagrammatic view illustrating a management method for a cycle prescribed in the IEEE 1394 standard.
Figure 3:
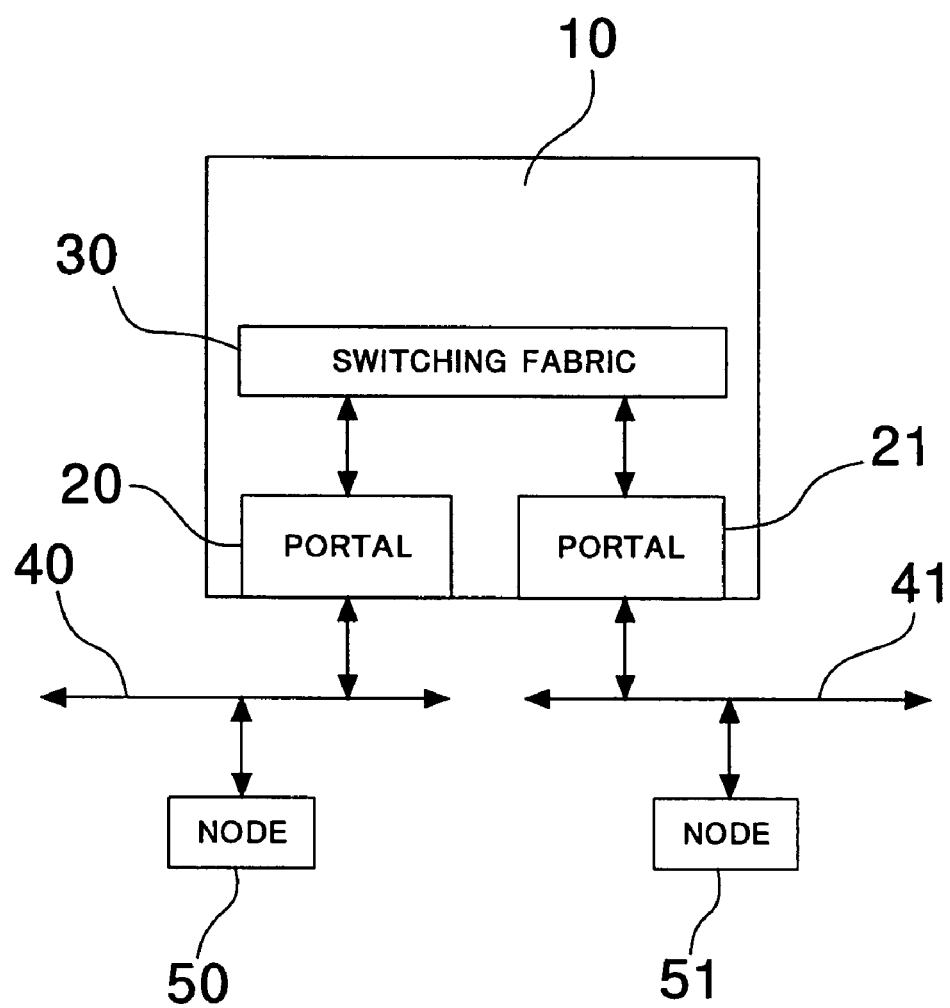
FIG. 3 is a diagrammatic view showing a basic construction of an IEEE 1394 bridge.
Figure 4:
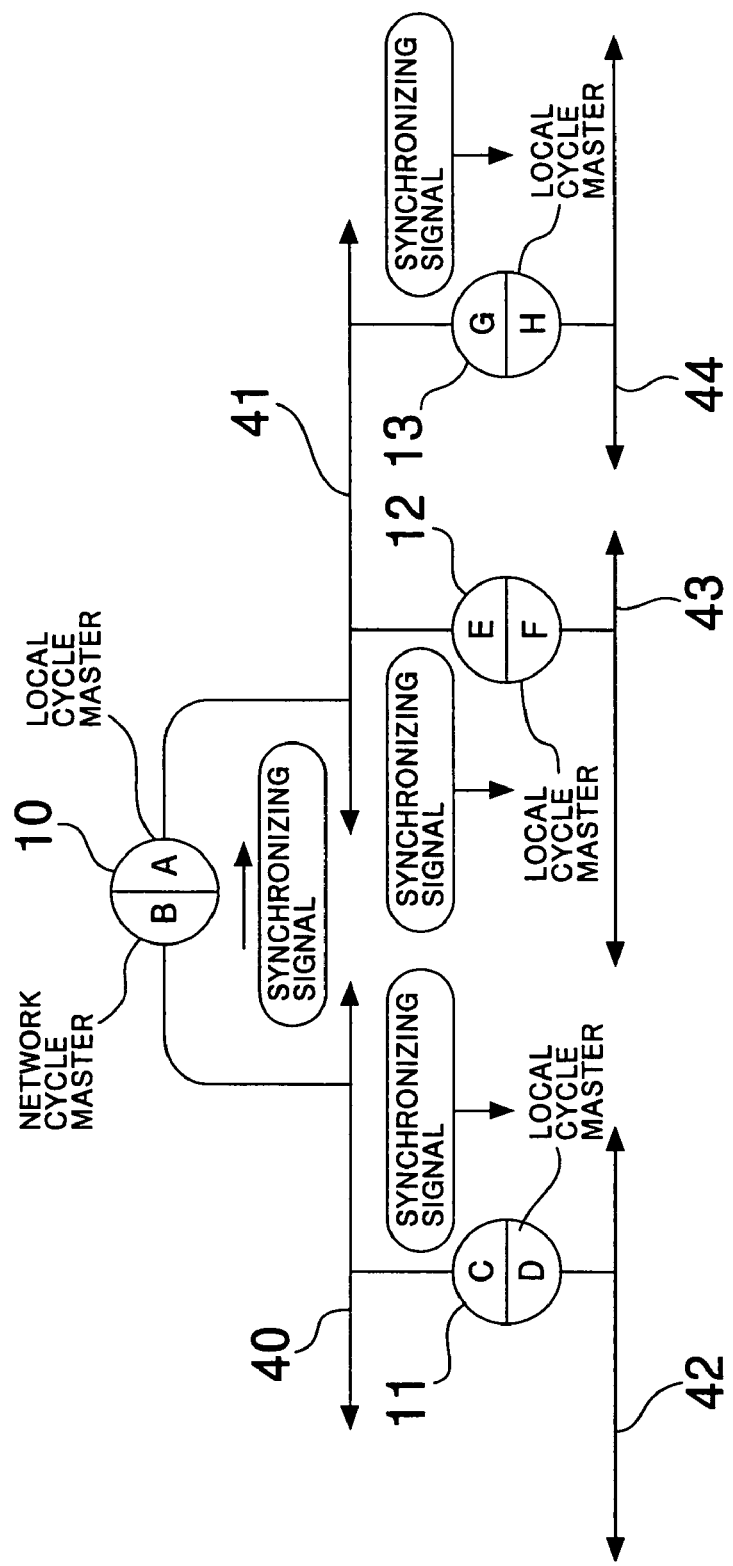
FIG. 4 is a diagrammatic view showing a network synchronization system to which the invention is applied.

FIG. 4 shows a network to which a network synchronization method according to the present invention is applied.

Referring to FIG. 4, five IEEE 1394 buses 40 to 44 are connected in a tree-like configuration by four bridges 10 to 13 to form a single network. It is to be noted that, in FIG. 4, each circle represents a bridge, and one half of the circle represents a portal. In other words, each of the bridges 10 to 13 has two portals. The portals are named A to H for the convenience of description.

In the network shown, the portal B of the bridge 10 is set as a network cycle master. The network cycle master functions as a reference clock source for the entire network and also as a cycle master for the IEEE 1394 bus 40 to which the network cycle master itself is connected. In this condition, in each of those buses to which the network cycle master is not connected, a portal which has the smallest hop number to the network cycle master is set as a local cycle master. The local cycle master has a function of synchronizing the cycle frequency thereof with the cycle frequency of the network cycle master and functions as a cycle master in the bus to which the local cycle master itself is connected. In accordance with the definition of a local cycle master, for example, in the IEEE 1394 bus 41, from among the three portals A, E and G connected to the bus, the portal A which has the smallest hop number from the portal B which is the network cycle master is set as a local cycle master. Similarly, in the buses 42 to 44, the portals D, F and H are set as a local cycle master.

Each local cycle master synchronizes the cycle frequency thereof with the cycle frequency of the other portal (hereinafter referred to as neighboring portal) in the same bridge. For example, the portal A can synchronize the cycle frequency thereof itself with that of the portal B by a method hereinafter described because the neighboring portal to it is the portal B which is the network cycle master. Meanwhile, the neighboring portal to the portal D is the portal C. Since the portal C is connected to the same bus 40 as the portal B, the cycle frequency of the portal C is synchronized with the portal B based on a cycle start packet sent from the portal B. Accordingly, the portal D can indirectly synchronize the cycle frequency thereof with the cycle frequency of the portal B by synchronizing the cycle frequency of the portal D itself with that of the portal C which is the neighboring portal. Also the portal F and the portal H can synchronize their cycle frequencies indirectly with the cycle frequency of the portal B by synchronizing the cycle frequencies of the portals F and H themselves with the cycle frequencies of the neighboring portals to them similarly to the portal D.

If the cycle frequencies of all of the local cycle masters are synchronized with that of the network cycle master, that is, the portal B, then since the other nodes can be synchronized using the cycle start packet, synchronism of the entire network is established.

Once a local cycle master is disposed in each bus by the method described above, even if an existing IEEE 1394 apparatus is connected to one of the buses, all of the buses can be synchronized with the clock of the network cycle master. Further, since control for the synchronization is performed all between the portals in the bridge apparatus, there is no necessity of transferring a control signal for synchronization onto the buses.

Figure 5:
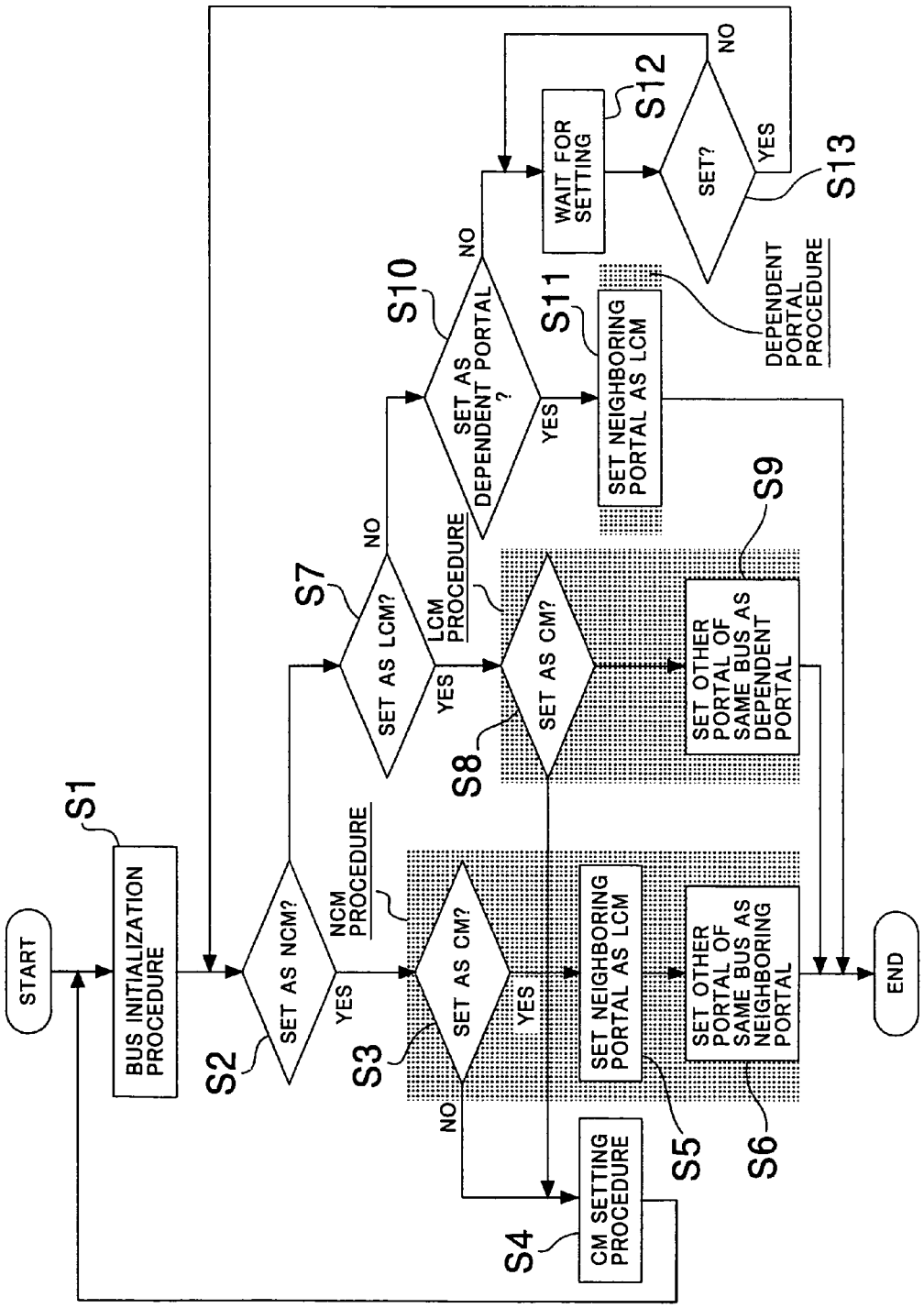
FIG. 5 is a flow chart illustrating a role decision procedure for a portal for network synchronization by the network synchronization system.

FIG. 5 is a flow chart illustrating a role decision method for a portal for network synchronization according to the network synchronization method of the present embodiment. It is to be noted that, in FIG. 5, the network cycle master is represented as NCM, a local cycle master as LCM, and a cycle master as CM in abbreviated form. Further, each portal which is set neither as the network cycle master nor as a local cycle master is represented as a dependent portal.

In the network synchronization method of the present embodiment, a method wherein the network cycle master is set manually by a manager of the network is applied. In particular, each bridge apparatus includes a network cycle master setting switch and the manager sets the switch. Where a plurality of bridge apparatus are used to construct a network, only one of the bridge apparatus is set so as to operate as the network cycle master, and all of the remaining bridge apparatus are set so that they may not operate as the network cycle master.

In the following, the procedure of FIG. 5 is described. After an initialization procedure for a bus (a tree ID process and a self ID process) prescribed in the IEEE 1394 standard is completed in step S1, each portal checks in step S2 whether or not the portal itself is set as the network cycle master. If the portal is the network cycle master (NCM) (YES in step S2), then it performs a NCM procedure beginning with step S3 which is hereinafter described. Similarly, the portal checks in step S7 or S10 whether or not the portal itself is set as a LCM or a dependent portal, and if it is set as such, it performs a LCM procedure beginning with step S8 or a dependent portal procedure in step S11 which is hereinafter described. Any portal which is not set to any of them (NO in steps S2, S7 and S10), it waits until it is set as one of them (steps S12 and S13), and after completion of the setting (YES in step S13), it performs the pertaining procedure.

The NCM procedure is described. A portal set as the NCM first checks in step S3 whether or not the portal itself is set as a cycle master on the bus. This is performed by checking the cmstr bit which is at the 24th bit from the top of a STATE_CLEAR register of the portal, and if this bit is 1, then the portal is a cycle master, but if the bit is 0, then the portal is not a cycle master. If it is detected that the portal itself is not a cycle master (NO in step S3), then it performs a procedure which is hereinafter described for making the portal itself a cycle master in step S4. On the contrary, if it is detected that the portal is a cycle master (YES in step S3), then it performs a procedure of first setting the neighboring portal to the portal as a local cycle master, that is, a LCM, in step S5 and then setting all of the other portals other than the portal itself on the bus to which the portal itself is connected as dependent portals in step S6.

The procedure mentioned above for making the portal itself a cycle master is described now. In order to make the portal itself a cycle master, a PHY configuration packet prescribed in the IEEE 1394 standard is used. The format of the PHY configuration packet is illustrated in FIG. 6. The packet has a 64-bit length, and the 32 bits in the latter half are redundant bits inverse to the 32 bits in the former half. The NCM transmits the PHY configuration packet wherein the R bit is set to 1 and a physical_ID of the NCM itself is described in the phy_ID field. Since the T bit and the gap_cnt field are fields used for non-pertaining objects, description of them is not given here. The PHY_configuration packet transmitted is received by all of the nodes on the bus. The node designated by the phy_ID field at this time is set as the root in the next bus initialization procedure. Since the IEEE 1394 standard prescribed that a root having a capacity of a cycle master operates as a cycle master, the node set as the NCM can be set as a cycle master by causing the bus initialization procedure to be started compulsorily after transmission of the PHY_configuration packet.

Subsequently, the LCM procedure is described. Since also a LCM must operate as a cycle master similarly to the NCM, if it is detected that the LCM itself is not a cycle master in step S8, then it becomes a cycle master through the same procedure as the procedure in step S4 described above. If it is confirmed that the LCM is a cycle master (YES in step S8), then it performs a procedure of setting all of the portals other than the portal itself on the bus to which the portal itself is connected as dependent portals in step S9.

On the other hand, in the dependent portal procedure, only the procedure of setting a neighboring portal as a LCM is performed by a dependent portal in step S11.

As the procedures described above are performed by all of the portals on the network independently of one another, all portals are set as the NCM, a LCM or a dependent portal. Thereafter, synchronism of the entire network is established by cycle synchronization control performed between neighboring portals.

Figure 7:
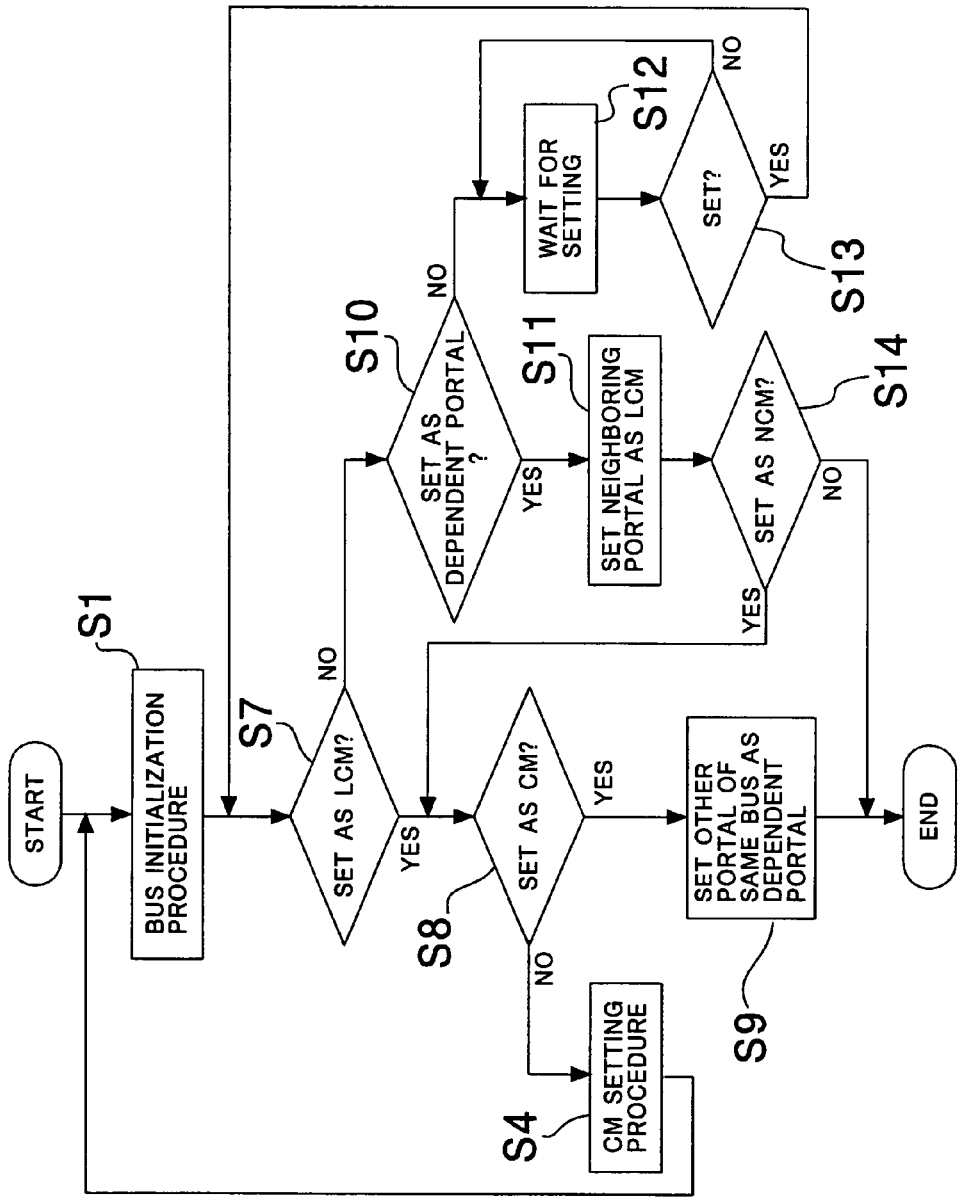
FIG. 7 is a flow chart showing a modification to the role decision procedure for a portal illustrated in FIG. 5.

It is to be noted that, in the network synchronization system of the present embodiment, also it is possible to use operation of another flow chart shown in FIG. 7 in place of the operation of the flow chart shown in FIG. 5. The flow chart of FIG. 7 eliminates redundant steps from the flow chart of FIG. 5 making use of the facts that what is to be performed by the NCM is both of the procedure by a LCM and the procedure by a dependent portal and that operation of the cycle synchronization control to be performed by the NCM is the same as that by a dependent portal. In particular, if a portal set as the NCM is set also as a dependent portal, then the portal set as the NCM performs the procedure for a LCM after the procedure for a dependent portal is completed. More specifically, in the flow chart of FIG. 7, the steps S3, S5 and S6 of the flow chart of FIG. 5 are omitted and the step S1 is followed directly by the step S7, and the step S2 is replaced by the step S14 which, however, follows the step S11. Here, if the discrimination in step S14 is YES, then the processing advances to step S8, but if the discrimination is NO, then the processing is ended. By performing such procedures as illustrated in FIG. 7, the size of software to be incorporated for role setting can be further reduced.

Further, while, in the network synchronization method of the present embodiment described above, the network cycle master is manually set by a manager of the network, also it is possible to replace the procedure with another procedure wherein negotiation is performed between the bridges to selectively determine a network cycle master automatically.

Figure 8:
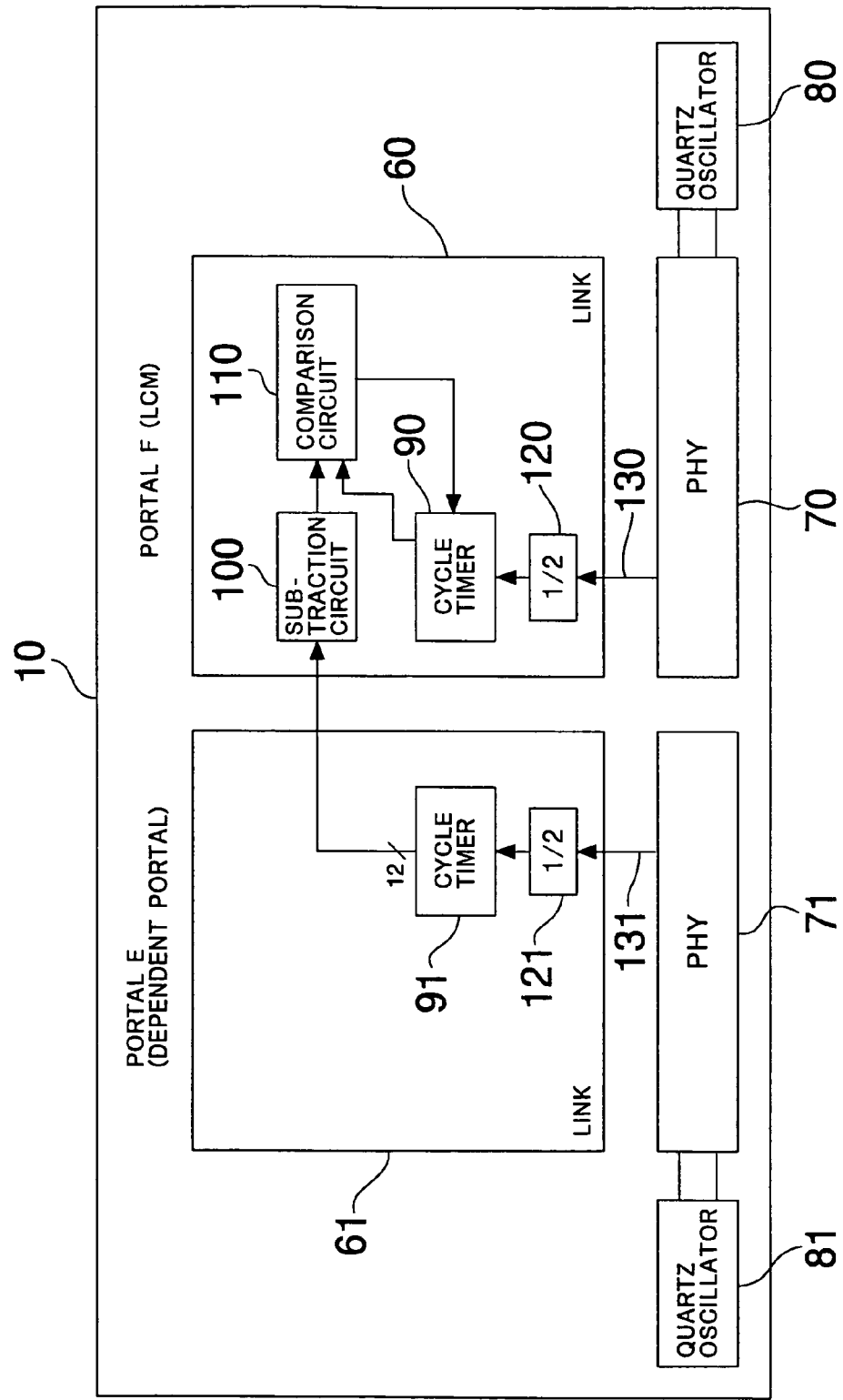
FIG. 8 is a block diagram of a first cycle synchronization control system between portals which can be applied to the network synchronization system.

FIG. 8 shows a first cycle synchronization control system between portals which can be applied to the network synchronization method of the present embodiment. While FIG. 8 shows a synchronization control system between the portal E and the portal F of the bridge 12 of FIG. 4, also synchronization control systems of the bridge 11 and the bridge 13 of FIG. 4 have similar constructions. Further, also in the bridge 10 of FIG. 4, the portal B which is the network cycle master has the same synchronization control system as that of the portal E which is a dependent portal in FIG. 8.

Referring to FIG. 8, the portal E of the bridge 10 which is a dependent portal includes a physical layer LSI (PHY) 71, a link layer LSI (LINK) 61, and a quartz oscillator 81 having a resonance frequency of 24.576 MHz ±100 ppm, which are connected in such a manner as shown in FIG. 8. A clock signal (SCLK) 131 having a frequency equal to twice the resonance frequency of the quartz oscillator 81 is supplied as a clock source for the link layer from the physical layer LSI 71 to the link layer LSI 61. However, since a cycle timer 91 which produces time information to be stored into a CYCLE_TIME register built in the link layer LSI 61 operates with 24.576 MHz, a clock signal obtained by dividing the frequency of the SCLK 131 into one half by means of a frequency dividing circuit 121 is inputted to the cycle timer 91. Meanwhile, also the portal F which acts as a LCM includes a physical layer LSI (PHY) 70 and a quartz oscillator 80 as well as a link layer LSI 60 in which a cycle timer 90 and a frequency dividing circuit 120 are built, which are connected and operate in a similar manner as in the portal E. A subtraction circuit 100 and a comparison circuit 110 for establishing cycle synchronism are built in the link layer LSI 60 of the portal F.

It is to be noted that, while a subtraction circuit and a comparison circuit are built also in the link layer LSI 61 of the portal E, since the circuits mentioned operate effectively only when the portal is set to a LCM, they are omitted in FIG. 8.

In the bridge 10 shown in FIG. 8, as a synchronizing signal for establishing cycle synchronism, the value of the cycle_offset field which is the lowest order 12 bits of the CYCLE_TIME register is transmitted as it is to the link layer LSI 60. In the link layer LSI 60, the subtraction circuit 100 performs subtraction of the value of the cycle_offset of the portal F from the value of the cycle_offset of the portal E and inputs a result of the calculation to the comparison circuit 110. The comparison circuit 110 performs comparison processing in accordance with the specifications illustrated in FIG. 9 and transmits a result of the comparison processing to the cycle timer 90. In particular, when the result of the subtraction is in the positive, the comparison circuit 110 outputs the value of 01 (2 bits); when the result of the subtraction is 0, the comparison circuit 110 outputs the value of 00 (2 bits); and when the result of the subtraction is in the negative, the comparison circuit 110 outputs the value of 10 (2 bits). It is to be noted that the comparison circuit 110 has a terminal not shown for receiving a pulse signal from the cycle timer 90 and has such specifications that it outputs a signal only for a time zone within which pulses are inputted to the terminal. The cycle timer 90 has such specifications that it transmits pulses toward the comparison circuit 110 when the value of the cycle_offset field of the cycle timer 90 itself is 0, and accordingly, the specifications are such that it outputs a comparison result in a period of 125 microseconds.

If the cycle timer 90 receives 01 (2 bits) from the comparison circuit 110, then it determines that the cycle frequency of the cycle timer 90 itself is low and increments the value of the cycle_offset by one. On the other hand, if it receives 10 (2 bits), then it determines that the cycle frequency of the cycle timer 90 is high and decrements the value of the cycle_offset by one. If it receives 00 (2 bits), then it performs nothing. By performing the foregoing control operation, it is confirmed that the cycle frequency of the portal F is synchronized with that of the portal E.

It is to be noted that, while, according to the comparison processing specifications of FIG. 9, the output value 0 of the subtraction circuit 100 is used as a threshold level for the comparison processing, it is otherwise possible to alter it so that the values of the cycle_offset fields of the two portals may have a fixed offset. Alternatively, the output timing specifications of the pulse signal to be inputted from the cycle timer 90 to the comparison circuit 110 may be modified while the comparison processing specifications of FIG. 9 are maintained so that a similar effect may be obtained.

In the first cycle synchronization control system described above, since only the cycle_offset field of the CYCLE_TIME register is transmitted from a dependent portal to a pertaining LCM, the differences between the second_count fields and the cycle_count fields of the CYCLE_TIME registers of the two portals are unspecified. As a first modification to this, if a construction wherein also the fields mentioned are transmitted from the dependent portal to the LCM is employed, then it is possible to control the differences between the values of the fields simultaneously with establishment of synchronism of the cycle frequency. For example, if the lowest order 25 bits of the CYCLE_TIME register is transmitted from the dependent portal to the LCM and the subtraction circuit calculates the difference for the 25 bits and then such control as to make the value of the difference have a predetermined value is performed, then it is possible to control up to the cycle_count field. Further, if all of 32 bits of the CYCLE_TIME register are transmitted, then the values of all of the fields can be controlled.

Figure 10:
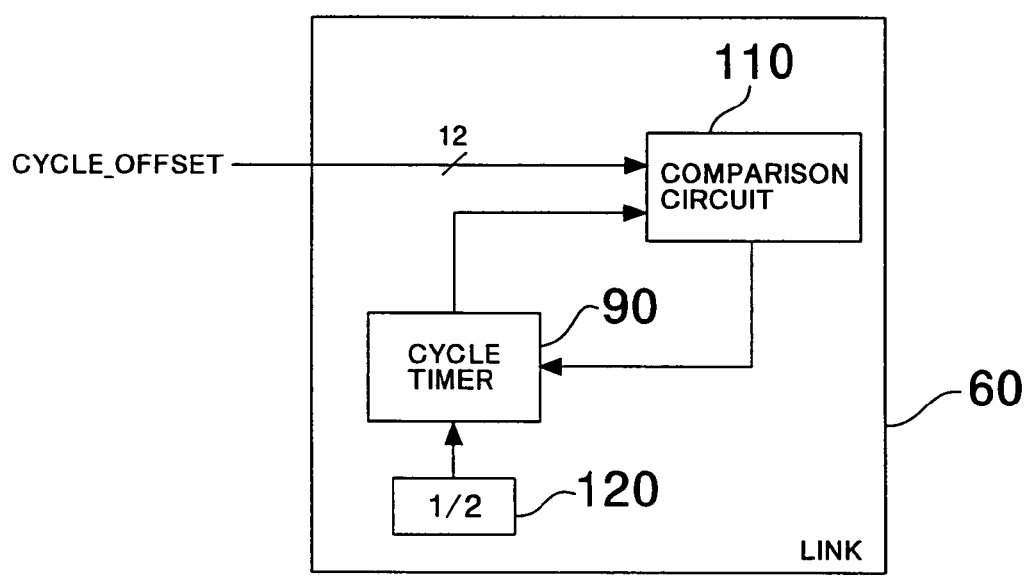
FIG. 10 is a diagrammatic view showing a link layer LSI employed in a modification to the first cycle synchronization control system shown in FIG. 8.

Further, as a second modification to the first cycle synchronization control system, a link layer LSI having a control system shown in FIG. 10 built therein may be used. In this instance, the comparison circuit 110 performs comparison processing using the value of the cycle_offset inputted from the neighboring portal at a timing at which a pulse signal is received form the cycle timer 90. Where the construction of FIG. 10 is employed, there is no necessity of using a subtraction circuit when compared with the construction of FIG. 8.

Figure 12:
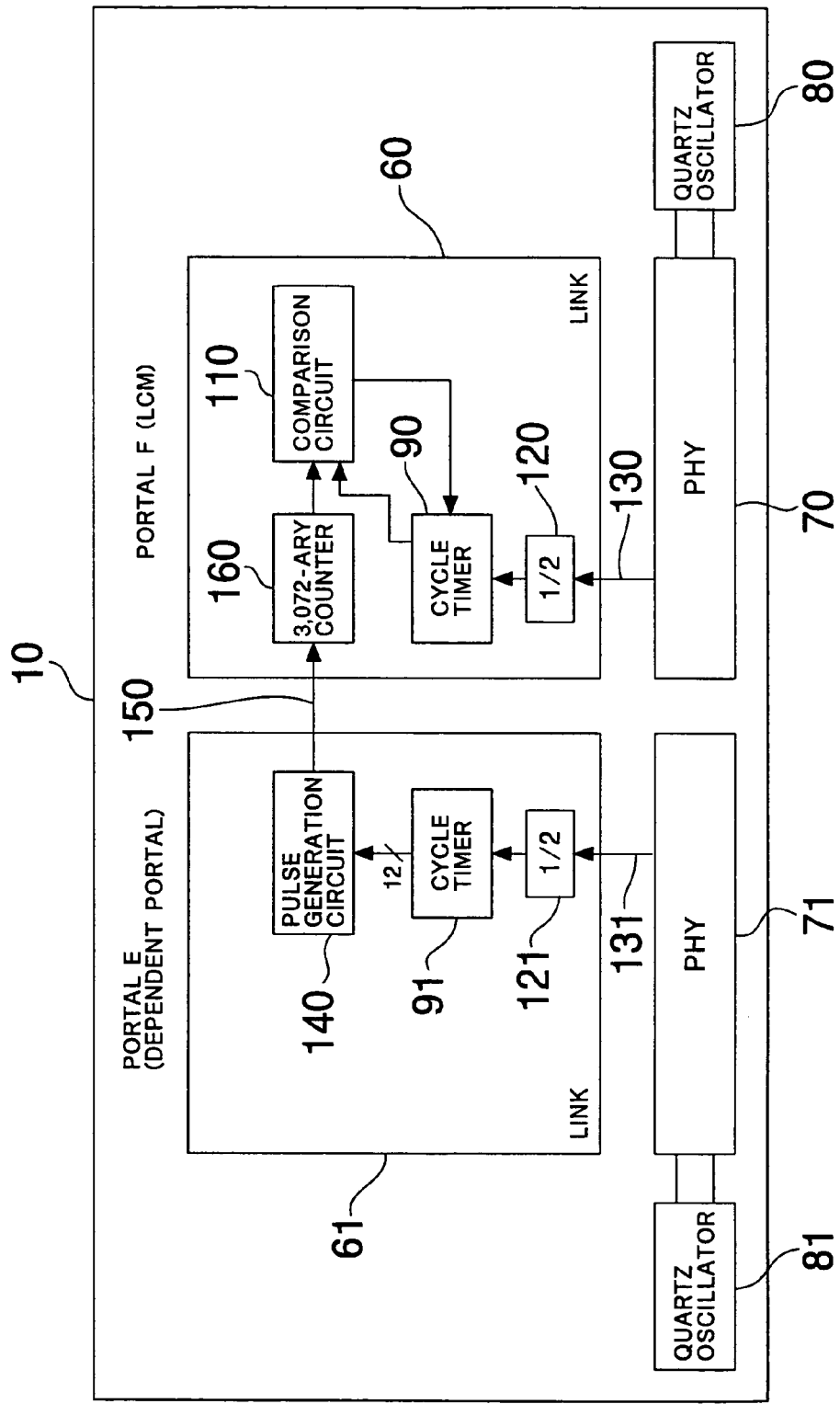
FIG. 12 is a diagrammatic view showing a second cycle synchronization control system between portals which can be applied to the network synchronization system.

FIG. 12 shows a second cycle synchronization control system which can be applied to the network synchronization method of the present embodiment. A physical layer LSI and a quartz oscillator same as those of the first cycle synchronization control system shown in FIG. 8 are used, but only a link layer LSI in which a cycle synchronization control system is built is exchangeably used.

Referring to FIG. 12, the link layer LSI 61 of the portal E which is a dependent portal additionally includes a pulse generation circuit 140. The pulse generation circuit 140 has a function of outputting a synchronizing pulse 150 at a timing at which the value of the cycle_offset field outputted from the cycle timer 91 becomes equal to a predetermined value. While the value of the cycle_offset ranges from 0 to 3,071 in decimal number, the timing at which the synchronizing pulse 150 is to be outputted is selected from among the values of the cycle_offset equal to or greater than 1,000 but equal to or smaller than 3,070. This is because there possibly is a cycle in which a value of the cycle_offset outside this range is not counted. For example, where the clock frequency of the portal A which is the cycle master of the bus 41 to which the portal E is connected is higher than that of the portal E, there possibly exists a cycle in which the value of the cycle_offset does not become equal to 3,071 by overwriting the value of the CYCLE_TIME register placed in a cycle start packet transmitted from the portal A. Or, since there is the possibility that the signaling timing of a cycle start packet may be delayed by approximately 42 microseconds in the maximum (approximately 1,000 in cycle_offset value in the maximum) by the traffic of asynchronous packets, a cycle in which no value is assumed even with a value of the cycle_offset equal to or higher than 0 but equal to or lower than 1,000. Accordingly, in order to allow a synchronizing pulse to be outputted with certainty for each cycle, the synchronizing pulse generation timing is specified as given above.

On the other hand, the link layer LSI 60 of the LCM additionally includes a 3,072-ary counter 160. The 3,074-ary counter 160 is incorporated in order to artificially regenerate the value of the cycle_offset of the cycle timer of the portal E, and has three characteristics that 1) it counts up in synchronism with a clock of approximately 25 MHz outputted from the frequency dividing circuit 120, 2) it returns the count value to 0 when the counter value becomes equal to 3,071, and 3) it is set to a predetermined value when the synchronizing pulse 150 is inputted thereto. Synchronization control of the cycle frequency is performed by inputting an output of the 3,072-ary counter 160 to the comparison circuit 110 and feeding back a result of the comparison when a pulse signal is inputted from the cycle timer 90 to the cycle timer 90.

Actually, operation has been evaluated in accordance with the settings that 1) the pulse generation circuit outputs the synchronizing pulse 150 when the value of the cycle_offset of the cycle timer 91 is 3,070, 2) the value of the 3,072-ary counter 160 is set to 3,070 when the synchronizing pulse 150 is inputted, 3) the cycle timer 90 outputs a pulse signal to the comparison circuit 110 when the value of the cycle_offset is 0, and 4) the comparison circuit 110 performs comparison operation of the specifications illustrated in FIG. 11, and normal cycle frequency synchronism has been confirmed. Also it has been confirmed that the difference between the values of the cycle_offset fields of the two portals can be varied by suitably varying the settings of 1) to 4) above.

Figure 13:
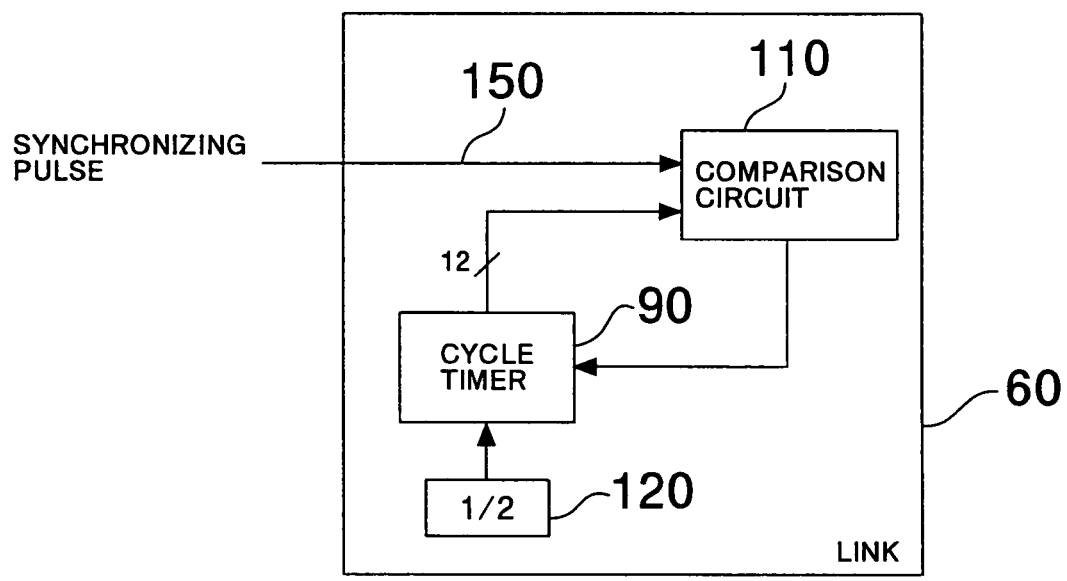
FIG. 13 is a diagrammatic view showing a construction of a link layer LSI employed in a modification to the second cycle synchronization control system.

It is to be noted that, in the present second cycle synchronization control system, it is also possible to use a link layer LSI, in which a control system shown in FIG. 13 is built, in the portal F. Here, the cycle_offset outputted from the cycle timer 90 and the synchronizing pulse 150 are inputted to the comparison circuit 110. Synchronization control is performed using the value of the cycle_offset when the synchronizing pulse 150 is inputted to the comparison circuit 110 and the comparison specifications illustrated in FIG. 11. Also where a 3,072-ary counter is not used for the LCM side control system in this manner, cycle synchronization control in which a synchronizing pulse is used can be performed.

While a preferred embodiment of the present invention has been described using specific terms, such description is for illustrative purposes only, and it is to be understood that changes and variations may be made without departing from the spirit or scope of the following claims.

What is claimed is:

1. A network synchronization system for a network wherein a plurality of buses are connected in a tree-like configuration by means of a bridge which has a plurality of portals each of which has a function of a node of the IEEE 1394 standard and to each of which a single bus which complies with the IEEE 1394 standard is connected, said network synchronization system comprising:

a network clock reference node functioning as a reference clock source for the entire network and as a network cycle master as prescribed in the IEEE 1394 standard, one of the portals included in said network being set as said network clock reference node; and a local clock reference node provided for each of the other of said plurality of buses other than the bus to which said network clock reference node is connected and serving as a local cycle master prescribed in the IEEE 1394 standard for the bus to which said local clock reference node is not connected, one of the portals connected to said each of the other buses of said plurality of buses which has the least number of hops of nodes up to said network clock reference node being set as said local clock reference node, said local clock reference node including a module for synchronizing a cycle frequency thereof with a cycle frequency of said network clock reference node, wherein said network clock reference node and each said local clock reference node exercise a role decision process to determine its timing role and to set itself up in its timing role.

2. A network synchronization method for a network wherein a plurality of buses are connected in a tree-like configuration by means of a bridge which has a plurality of portals each of which has a function of a node of the IEEE 1394 standard and to each of which a single bus which complies with the IEEE 1394 standard is connected, said network synchronization method comprising:

determining a network clock reference node which functions as a reference clock source for the entire network and as a network cycle master as prescribed in the IEEE 1394 standard;

determining a local clock reference node which functions as a local cycle master which synchronizes a cycle frequency thereof with a network cycle frequency of said network clock reference node;

in each of said network clock reference node and the local clock reference node or nodes, setting all of the other portals than said network clock reference node or the local clock reference node connected to the bus to which said network clock reference node or the local clock reference node is connected as non-reference nodes; and in each of said network clock reference node and said non-reference nodes, setting all of the other of said plurality of portals of the bridge to which said network clock reference node or the non-reference node is connected as the local clock reference node.

3. A network synchronization method as claimed in claim 2, wherein said determining a network clock reference node is performed manually by a manager of said network.

4. A network synchronization method as claimed in claim 2, wherein each of said network clock reference node and said non-reference nodes transmits a synchronizing signal to all of the other local clock reference nodes of the bridge to which said network clock reference node or the non-reference node is connected, and each of the local clock reference nodes uses the received synchronizing signal to synchronize the cycle frequency of the local clock reference node itself with the cycle frequency of said network clock reference node.

5. A network synchronization method as claimed in claim 4, wherein the synchronizing signal is a signal of a 32-bit width of a CYCLE_TIME register of the mode from which the synchronizing signal is transmitted.

6. A network synchronization method as claimed in claim 4, wherein the synchronizing signal is a signal of a 25-bit width of the lowest order 25 bits of a CYCLE_TIME register of the node form which the synchronizing signal is transmitted.

7. A network synchronizing method as claimed in claim 4, wherein the synchronizing signal is a signal of a 12-bit width of the lowest order 12 bits of a CYCLE_TIME register of the node from which the synchronizing signal is transmitted.

8. A network synchronization method as claimed in claim 4, wherein the synchronizing signal is a signal of a 32-bit width of a CYCLE_TIME register of the node from which the synchronizing signal is transmitted or of a 25-bit width of the lowest order 25 bits or a 12-bit width of the lowest order 12 bits of said CYCLE_TIME register, and said local clock reference node periodically performs control of increasing or decreasing a cycle_offset field of the CYCLE_TIME register of said local clock reference node with a fixed number so that a difference between a portion of said CYCLE_TIME register of said local clock reference node having an equal bit width to that of the synchronizing signal and the value of the synchronizing signal may be fixed.

9. A network synchronization method as claimed in claim 8, wherein a period in which the control is performed is equal to a time for 3,072 clocks of clock source of 24.576 megahertz included in the local clock reference node.

10. A network synchronization method as claimed in claim 4, wherein the synchronizing signal is a pulse signal which is generated at a timing at which the value of a cycle_offset field of a CYCLE_TIME register of the node from which the synchronizing signal is transmitted becomes equal to a predetermined value.

11. A network synchronization method as claimed in claim 10, wherein the predetermined value is one of integers equal to or greater than 1,000 but equal to or smaller than 3,070.

12. A network synchronization method as claimed in claim 10, wherein said local clock reference node includes a counter which counts up with a clock source of 24.576 megahertz and returns its count value to 0 when the count value becomes equal to 3,071 but is set to a predetermined value when the pulse signal is received, and periodically performs control of increasing or decreasing the cycle_offset field of the CYCLE_TIME register of said local clock reference node with the fixed number so that the difference between the count value of said counter and the value of the cycle_offset field of the CYCLE_TIME register may be equal.

13. A network synchronization method as claimed in claim 10, wherein the local reference node performs, each time the pulse signal is received, control of increasing or decreasing the cycle_offset register of the CYCLE_TIME register thereof with a fixed number so that the value of the cycle_offset field when the pulse signal is received may be equal to a predetermined value.

* * * * *